(12) United States Patent
Siravuri

(10) Patent No.: US 10,878,391 B2
(45) Date of Patent: Dec. 29, 2020

(54) SYSTEMS AND METHODS FOR FUNCTIONALLY CUSTOMIZABLE USER INTERFACES

(71) Applicant: Emerson Electric Co., St. Louis, MO (US)

(72) Inventor: Rishi Siravuri, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 226 days.

(21) Appl. No.: 15/078,771

(22) Filed: Mar. 23, 2016

(65) Prior Publication Data

US 2017/0277407 A1 Sep. 28, 2017

(51) Int. Cl.
*G06F 3/0484* (2013.01)
*G06F 3/0482* (2013.01)
*G06Q 20/12* (2012.01)
*G06F 40/106* (2020.01)

(52) U.S. Cl.
CPC ........ *G06Q 20/123* (2013.01); *G06F 40/106* (2020.01)

(58) Field of Classification Search
CPC .............. G06F 17/2288; G06F 3/0482; G06F 3/04845; G06F 40/106; G06Q 20/123
See application file for complete search history.

(56) References Cited

U.S. PATENT DOCUMENTS

| | | | |
|---|---|---|---|
| 6,031,532 A * | 2/2000 | Gourdol | G06F 3/04817 345/629 |
| 6,985,876 B1 | 1/2006 | Lee | |
| 7,028,912 B1 | 4/2006 | Rosen | |
| 7,123,700 B1 | 10/2006 | Weaver, III et al. | |
| 7,156,318 B1 | 1/2007 | Rosen | |
| 7,263,663 B2 | 8/2007 | Ballard et al. | |
| 7,793,227 B2 | 9/2010 | Wada et al. | |
| 8,196,185 B2 | 6/2012 | Geadelmann et al. | |
| 8,799,353 B2 | 8/2014 | Larsson et al. | |
| 2003/0151538 A1* | 8/2003 | Escobosa | G06F 8/65 341/176 |
| 2004/0012628 A1* | 1/2004 | Kropf | G06F 9/4443 715/744 |
| 2005/0021935 A1* | 1/2005 | Schillings | G06F 8/60 713/1 |

(Continued)

*Primary Examiner* — Tan H Tran
(74) *Attorney, Agent, or Firm* — Armstrong Teasdale LLP

(57) ABSTRACT

A method for customizing an interactive presentation layout for a remote system controller is disclosed. The method is implemented by a functional interface customization (FIC) computing device comprising a memory device, a processor, and the interactive presentation layout. The method includes storing a plurality of presentation layout files associated with a plurality of presentation layouts for the remote system controller in the memory device; storing a plurality of layout component files associated with a plurality of layout components in the memory device; receiving, from a consumer computing device, a selection of a presentation layout of the plurality of presentation layouts; and transmitting a presentation layout file of the plurality of presentation layout files to the remote system controller for installation on the remote system controller, wherein the presentation layout file corresponds to the presentation layout selected by the consumer computing device.

20 Claims, 12 Drawing Sheets

(56) References Cited

U.S. PATENT DOCUMENTS

| | | | |
|---|---|---|---|
| 2007/0069880 A1* | 3/2007 | Best | B60K 37/02 340/461 |
| 2007/0073908 A1* | 3/2007 | Gormley | G05B 19/0421 710/8 |
| 2009/0063179 A1* | 3/2009 | Huang | G06F 8/61 705/1.1 |
| 2009/0327934 A1* | 12/2009 | Serpico | G06F 40/186 715/764 |
| 2010/0138763 A1* | 6/2010 | Kim | G06F 1/1626 715/765 |
| 2012/0004743 A1* | 1/2012 | Anne | G05B 19/409 700/83 |
| 2012/0191257 A1* | 7/2012 | Corcoran | G06F 3/0362 700/278 |
| 2012/0316984 A1* | 12/2012 | Glassman | G06Q 10/06 705/26.7 |
| 2013/0067370 A1* | 3/2013 | Branson | G06F 3/048 715/765 |

* cited by examiner

SYSTEMS AND METHODS FOR FUNCTIONALLY CUSTOMIZABLE USER INTERFACES

FIELD

The field of the disclosure relates to user selectable and customizable interfaces for display on a system controller. More specifically, the systems and methods relate to functional interfaces on system controllers that are selected, designed, and/or customized according to a consumer's preference and then presented on the display of a system control device, such as an HVAC thermostat.

BACKGROUND

A well-designed user interface is important to the usability of a system controller, especially in systems in which where a consumer interacts with a system controller to cause physical effects external to the system controller itself. Examples of system controllers include control devices that manage ambient phenomena (e.g., temperature system controllers, lighting system controllers, etc.), industrial control devices (e.g., industrial component monitors), vehicle control devices (e.g., personal car computer screens, etc.), or the like. Many control devices feature touch-enabled interfaces, (e.g., devices with touch screens where there are no physical buttons and the consumer touches an interactive screen to drive functions of the system controller). Various consumer segments (e.g., demographics-based segments) have differing needs and preferences regarding usability of their system controller displays. However, most commercially available system controllers do not allow for customization or selection according to a consumer's preferences. Consumers are frequently unable to personalize their system controller interfaces and must adjust themselves to the specifications of the system controller interface that were fixed by the manufacturer.

Known methods of customization typically provide limited options (e.g., switching between simple and complex display mode only). Some known methods allow for only a single display or hiding of individual display elements. Known methods are also limited in that the consumer typically adjusts features of the system controller manually (e.g., by going into a settings menu on the system controller and changing the background color). This further narrows customizability because manufacturers may provide few preloaded customization options for the sake of economy, thereby preventing consumers from customizing their system controllers to match their exact preferences. At best, manufacturers may provide options that appeal to the largest majority of consumers. Finally, known systems and methods that permit customization are typically directed to customization of non-functional features, such as a color scheme or a background image, and do not provide customization options that are drawn to functional aspects of the system controller.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method for customizing an interactive presentation layout for a remote system controller is provided. The method is implemented by a functional interface customization (FIC) computing device comprising a memory device, a processor, and the interactive presentation layout. The method includes storing a plurality of presentation layout files associated with a plurality of presentation layouts for the remote system controller in the memory device; storing a plurality of layout component files associated with a plurality of layout components in the memory device; receiving, from a consumer computing device, a selection of a presentation layout of the plurality of presentation layouts; and transmitting a presentation layout file of the plurality of presentation layout files to the remote system controller for installation on the remote system controller, wherein the presentation layout file corresponds to the presentation layout selected by the consumer computing device.

In another aspect, a system for customizing an interactive presentation layout for a remote system controller includes a database configured to store customization data and a functional interface customization (FIC) computing device configured to be coupled to the database. The FIC computing device is further configured to: store a plurality of presentation layout files associated with a plurality of presentation layouts for the remote system controller in the memory device; store a plurality of layout component files associated with a plurality of layout components in the memory device; receive, from a consumer computing device, a selection of a presentation layout of the plurality of presentation layouts; and transmit a presentation layout file of the plurality of presentation layout files to the remote system controller for installation on the remote system controller, wherein the presentation layout file corresponds to the presentation layout selected by the consumer computing device.

In another aspect, a non-transitory computer readable medium includes computer executable instructions for customizing an interactive presentation layout for a remote system controller. When executed by a functional interface customization (FIC) computing device comprising a processor in communication with a memory device, the computer executable instructions cause the FIC computing device to store a plurality of presentation layout files associated with a plurality of presentation layouts for the remote system controller in the memory device; store a plurality of layout component files associated with a plurality of layout components in the memory device; receive, from a consumer computing device, a selection of a presentation layout of the plurality of presentation layouts; and transmit a presentation layout file of the plurality of presentation layout files to the remote system controller for installation on the remote system controller, wherein the presentation layout file corresponds to the presentation layout selected by the consumer computing device.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
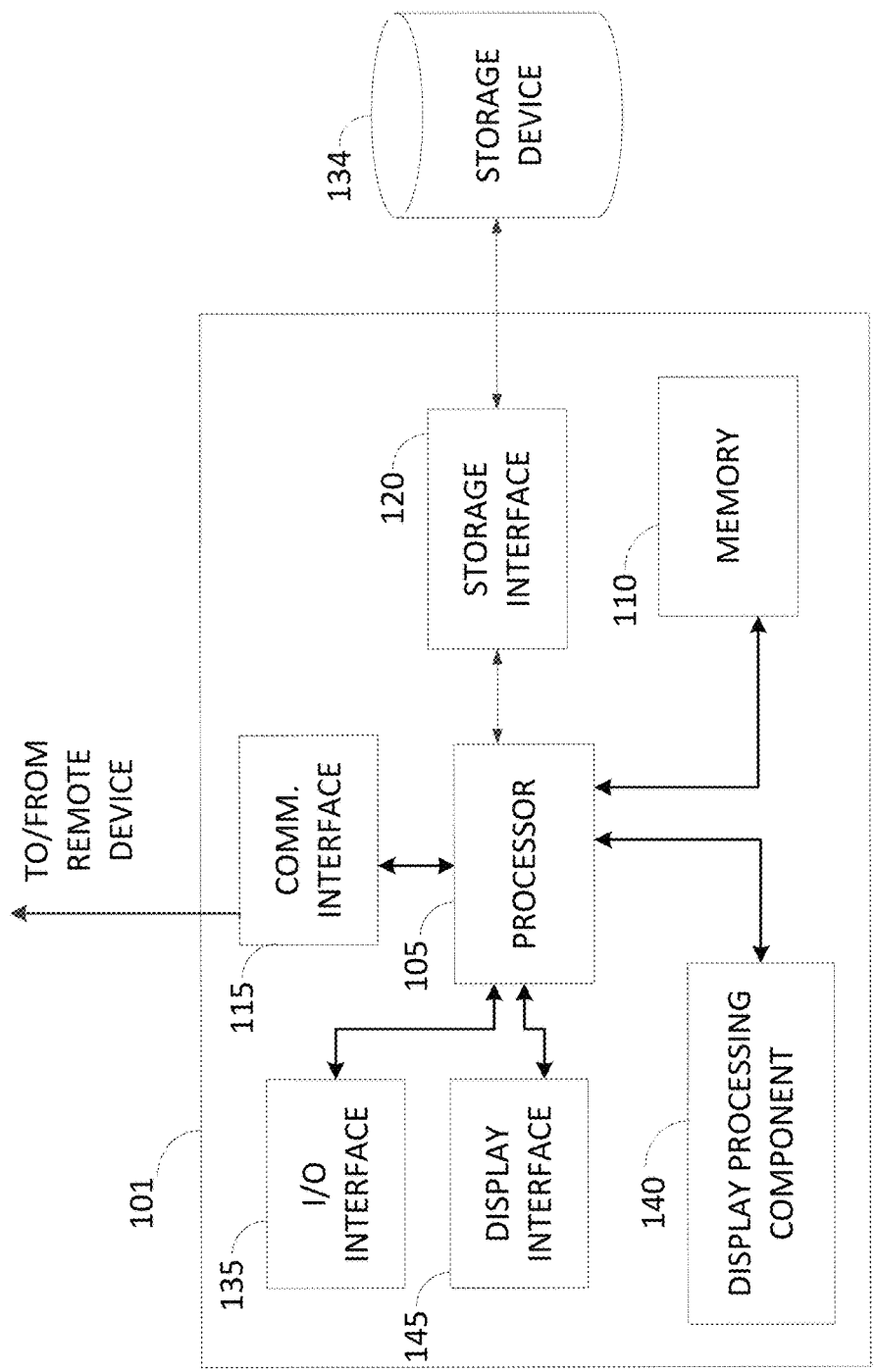
FIG. 1 is an example configuration of a functional interface customization (FIC) computing device that is used to perform selection and customization of functional component interfaces.

This disclosure relates to systems and methods for selection and customization of functional interfaces on computer-based components. The three primary components of an example system include a functional interface customization (FIC) computing device (i.e., a server for customizing and/or selecting preset layouts), a remote system controller (e.g., an HVAC thermostat), and a consumer computing device (e.g., a consumer's phone, tablet, laptop, desktop computer, phablet, etc.).

The FIC computing device is specifically configured to provide functional interfaces to allow customization of the remote system controller. The functional interfaces may be selected by the consumer from predesigned functional interfaces or may be designed by the consumer. The FIC computing device is configured to receive inputs/selections from the consumer computing device, process those inputs, and provide the designed/selected interface to the remote system controller to display. The interface may be provided directly to the system controller or provided to the system controller via the consumer's computing device. Transfer of the interface to the system controller may occur using any suitable wired or wireless communication technique/protocol, including Wi-Fi, NFC, Bluetooth, LAN, WAN, and the like.

The FIC computing device is configured to store, in a memory device, a number of computer data files. These computer data files can be grouped into layout component files and presentation layout files. Layout component files contain data relating to individual components (e.g., buttons, shapes, text, and associated properties such as color, font, size, position, or the like). Presentation layout files include layout component files organized into complete presentation layouts that may be presented on a display interface for the remote system controller (e.g., a portrait layout, a landscape layout, a blank layout, a container-type layout that can accommodate layout components in defined positions or buckets, or the like).

In some embodiments, the FIC computing device is configured to display a list of predesigned presentation layouts on the consumer computing device for selection by the consumer. The FIC computing device is configured to receive an input from the consumer computing device pertaining to a particular remote system controller (e.g., a system controller identifier) and a selection of a presentation layout.

In other embodiments, the FIC computing device is embodied in software installed on the consumer computing device. For example, the FIC computing device may be an application installed on the consumer computing device. A user may instantiate an application or software package on the consumer computing device that enables selection and customization of presentation layouts.

The FIC computing device is further configured to update an account for the consumer in a memory device with the selection of the presentation layout for the remote system controller. In the example embodiment, the FIC computing device informs the remote system controller that a new interface has been selected and the remote system controller retrieves the file(s) for the selected presentation layout and installs it on the remote system controller. Alternatively, the FIC computing device transmits the presentation layout file for the selected presentation layout to the remote system controller, directing the remote system controller to install the presentation layout file. The FIC computing device is configured to receive a confirmation from the remote system controller, and display a confirmation message on the consumer computing device, confirming that the display on the remote system controller has been updated in accordance with the selected presentation layout.

In at least some implementations, the FIC computing device is configured to display a list of layout components and a list of presentation layouts to the consumer on the consumer computing device display screen. The consumer can select a layout component, such as a button and customize it if desired (e.g., by typing in label text, by resizing or reshaping the button, or the like), repeating this process for multiple layout components. Moreover, the FIC computing device is configured to display a list of functions relevant to the remote system controller (e.g., temperature increase, temperature decrease, programmable temperature settings, etc.). The consumer may assign a particular function to the selected layout component (e.g., the button will function as a temperature increase button). The consumer can select a presentation layout (including a blank presentation layout) and use the consumer computing device to position each layout component (with associated customization) on the presentation layout. For example, the consumer may position the selected button, now functioning as a temperature increase button, near the top of the presentation layout, and a corresponding temperature decrease button near the bottom of the presentation layout. The FIC computing device is also configured to give the user the ability to edit or rearrange components already positioned on a predesigned presentation layout.

In at least some implementations, the consumer creates a customized user interface layout on the consumer computing device. The customized layout may be sent from the consumer computing device directly to the remote system controller (such as via Bluetooth or Wi-Fi) and/or may be uploaded to the FIC. The FIC computing device is configured to receive, from the consumer computing device, the customized layout components, the presentation layout, and an identifier for the remote system controller to be targeted (e.g., an IP address for a thermostat in the consumer's home). The layout components and presentation layout may be received in separate data communications or in a single data communication. The FIC delivers the presentation layout and layout components directly or indirectly to the system controller.

In some embodiments, the selected/customized user interface is sent to the system controller to allow the consumer to view and interact with the user interface before deciding to finalize the selection/purchase. The FIC computing device generates a candidate presentation layout file based on a selected presentation layout file including any consumer customization. The FIC computing device is configured to transmit the candidate presentation layout file to the remote system controller based on the device identifier provided by the consumer. The FIC computing device is further configured to cause the remote system controller to display the candidate presentation layout on a display interface to allow the consumer to review the candidate presentation layout before finalizing the layout. In some embodiments, the consumer can select to finalize and/or purchase the candidate presentation file on the remote system controller and the FIC computing device is configured to receive the consumer's selection. As used herein, "purchase" includes acquiring without payment, acquiring as part of a subscription, acquiring in exchange for a nonmonetary consideration (e.g., receiving in exchange for viewing one or more advertisements), or any other method of acquiring use of the presentation layout with or without payment.

In some embodiments, the FIC computing device is not remote from the remote system controller but is installed on shared hardware, e.g., within a consumer's house. The FIC computing device may be part of a larger system that controls other functions of a consumer's house. For example, components within a consumer's house may be controlled by a single system (e.g., lighting, windows, security, garage systems, home networking, or the like). The remote system controller interface that is the target of presentation layouts may be part of a tabbed or associated interface in association with other interfaces for other controls such as lighting, security, or the like. In other embodiments, the FIC computing device may be a remote system interacting with a functional component computing device placed in a consumer's home, or installed on a consumer's mobile device, or the like. For example, the FIC computing device may transmit presentation layouts and layout components to a thermostat placed within a consumer's home.

In still further embodiments, the FIC computing device may interact with a functional component computing device that is not (or not just) a remote system controller, but has multiple other functionalities. For example, the consumer may use the functional component computing device to, without limitation, control temperature, view the current time, view the current date, view and modify events and tasks for the consumer, control other components (e.g., fans, doors, appliances, etc.), control home security systems, communicate with others (e.g., via telephone and/or text functionality), control other computing devices (home networking systems, consumer computing devices, embedded computer systems within appliances), or any other function enabling remote control by a functional component computing device. In one embodiment, the functional component computing device has multiple selectable screens or views corresponding to each function it controls. Each screen displays its contents according to a presentation layout configured using the FIC computing device.

For each of the abovementioned functions or any other similar functions performed by the functional component computing device, the FIC computing device may deploy a variety of presentation layouts and layout components. Presentation layouts and layout components may be specific to each functionality. For example, an organizer functionality may require certain layout components corresponding to task alerts (e.g., popup icons). A clock functionality may require certain layout components corresponding to a clock face (e.g., hour, minute, and second hand, or digital display layout components). The FIC computing device is configured to enable the consumer to, via the consumer computing device, select presentation layouts and layout components for each functionality and, in some embodiments, to customize them according to the consumer's preference.

FIG. 1 is an example configuration of a FIC computing device 101, which may be used in a functional interface customization system to perform selection and customization of functional component interfaces. FIC computing device 101 includes a processor 105, e.g., a central processing unit (CPU) of a computer for executing instructions. Instructions may be stored in a memory area 110, for example. Processor 105 may include one or more processing units, e.g., in a multi-core configuration, for executing instructions. The instructions may be executed within a variety of different operating systems on the FIC computing device 101, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language e.g., and without limitation, C, C#, C++, Java, or other suitable programming languages, etc.

Processor 105 is operatively coupled to a communication interface 115 such that FIC computing device 101 is capable of communicating with a remote device such as a user system or another FIC computing device 101. For example, communication interface 115 may receive communications from user computing devices via the Internet. Additionally, the instructions executed via processor 105 may cause various data manipulations on data stored in storage 134, e.g., and without limitation, create, read, update, and delete procedures. Processor 105 is also operatively coupled to an input/output interface 135 that connects to one or more input/output devices used by a user to control operation of FIC computing device 101. Input/output devices may include, without limitation, one or more of a keyboard, mouse, microphone, touchpad, keypad, stylus, speakers, or any device configured to provide user input to a human user and transmit output. Processor 105 is also operatively coupled to a display processing component 140 and a display interface 145.

In one embodiment, display processing component 140 is a dedicated computer processor for image processing and rendering tasks, e.g., and without limitation, a graphics processing pipeline. Display interface 145 represents any display device used to render images for viewing by user, including, and without limitation, computer monitors, mobile device screens, touch-enabled screens, LCD displays, TFT displays, dot-matrix displays, and the like. Processor 105 is configured to send some or all of its image processing tasks to display processing component 140, receive processed images to display processing component 140, and display the processed images via display interface 145 to a user.

Processor 105 may also be operatively coupled to a storage device 134. Storage device 134 is any computer-operated hardware suitable for storing and/or retrieving data. In some embodiments, storage device 134 is integrated in FIC computing device 101. In other embodiments, storage device 134 is external to FIC computing device 101 and is similar to database 120 (shown in FIG. 1). For example, FIC computing device 101 may include one or more hard disk drives as storage device 134. In other embodiments, storage device 134 is external to FIC computing device 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120 (also referred to herein as database 120). Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
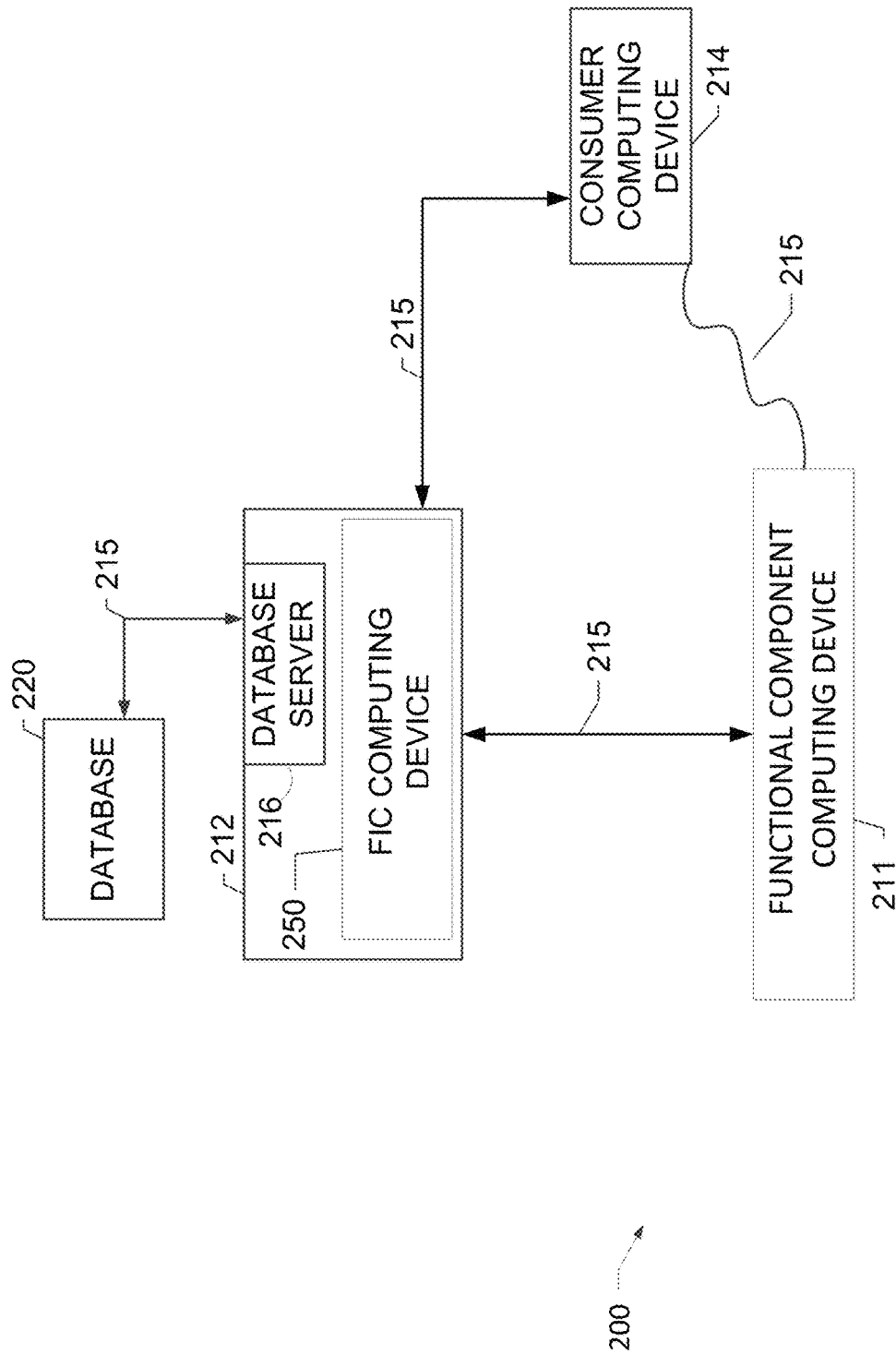
FIG. 2 is a block diagram of an example functional interface customization environment, in which a variety of computing devices are communicatively coupled to each other via network connections.

FIG. 2 is a block diagram of an example functional interface customization environment 200, in which a variety of computing devices are communicatively coupled to each other via network connections 215. Network connections 215 may be Internet, LAN/WAN, or other connections capable of transmitting data across computing devices. Environment 200 shows a functional interface customization (FIC) computing device 250 and a database server 216. In one embodiment, FIC computing device 250 and database server 216 are components of a functional interface customization (FIC) system 212. FIC system 212 may be a server, a network of multiple computing devices, a virtual computing device, or the like. FIC computing device 250 is connected to a consumer computing device 214 and a remote system controller 211, also referred to herein as a functional component computing device 211. In one embodiment, functional component computing device 211 is connected to additional components (not shown) that perform other physical functions, such as generate heat or cool air. For example, functional component computing device 211 may be connected to a home furnace or an air conditioning unit. Commands transmitted from functional component computing device 211 may cause these additional components to adjust their functions and, for example, generate heat to raise the temperature in a consumer's house.

Database server 216 is connected to database 220, which contains information on a variety of matters, as described below in greater detail. In one embodiment, database 220 is stored on FIC system 212 and can be accessed by potential users of FIC system 212. In an alternative embodiment, database 220 is stored remotely from FIC system 212 and may be non-centralized.

In some embodiments, functional component computing device 211 is embedded within a hardware-based host, e.g., a thermostat, temperature controller, or HVAC system controller. It should be noted that a thermostat is only used here as an example, and functional component computing device 211 may be associated with any other functionality (e.g., clock, calendar, organizer, appliance controller) and may be embedded within a hardware-based host or separate from the physical component it is designed to control. In one embodiment, functional component computing device 211 is managed by FIC computing device 250. For example, FIC computing device 250 sends and receives data to and from functional component computing device 211. For example, FIC computing device 250 transmits presentation layouts and layout components to functional component computing device 211 and receives confirmation messages or error messages from functional component computing device 211.

Functional component computing device 211 is communicatively coupled to one or more consumer computing devices 214. Alternatively, functional component computing device 211 is not in direct communication with consumer computing device 214 and instead communicates only with FIC computing device 250. In one embodiment, a consumer computing device 214 is a computing device operated by a user or homeowner to select and customize functional component interfaces. For example, consumer computing device 214 may be a desktop computing device, mobile computing device, tablet, or the like. A user may use consumer computing device 214 for other applications such as communications, word processing, or the like. In one embodiment, one of the applications installed on consumer computing device 214 is used for selection and customization of functional component interfaces. For example, the user may use the application to retrieve presentation layouts and layout components from FIC computing device 250. Consumer computing device 214 may transmit presentation layouts and layout components directly to functional component computing device 211 in order to update a user interface displayed on functional component computing device 211. Alternatively, FIC computing device 250 may receive selections or designs from consumer computing devices 214 and deploy to functional component computing device 211.

Database 220 may include a single database having separated sections or partitions or may include multiple databases, each being separate from each other. Database 220 may store component data for each functional component in communication with FIC computing device 250. Component data may include data regarding a component's status, version, currently installed theme, associated user accounts, or the like. Database 220 may also store consumer instructions, updates, queries, version updates or the like. Database 220 may also store patches, fixes, update schedules, and other update data received from theme vendors that supply third party themes for installation on functional component computing device 211. Database 220 may also store component maintenance data (e.g., thermostat health checks, data integrity checks, or the like). Database 220 may also store report data (e.g., periodic reports FIC computing device 250 may provide to various operators regarding particular components). Database 220 may also store various algorithms that are used to programmatically update a thermostat's status or theme.

In some embodiments, FIC computing device 250 does not consist of generic computer hardware, nor does it require merely generic computer instructions to perform the above functions. Rather, FIC computing device 250 is a specially designed and customized computing device built to perform the specific function of functional interface customization for various components such as thermostats, HVAC controllers, or the like.

Figure 3:
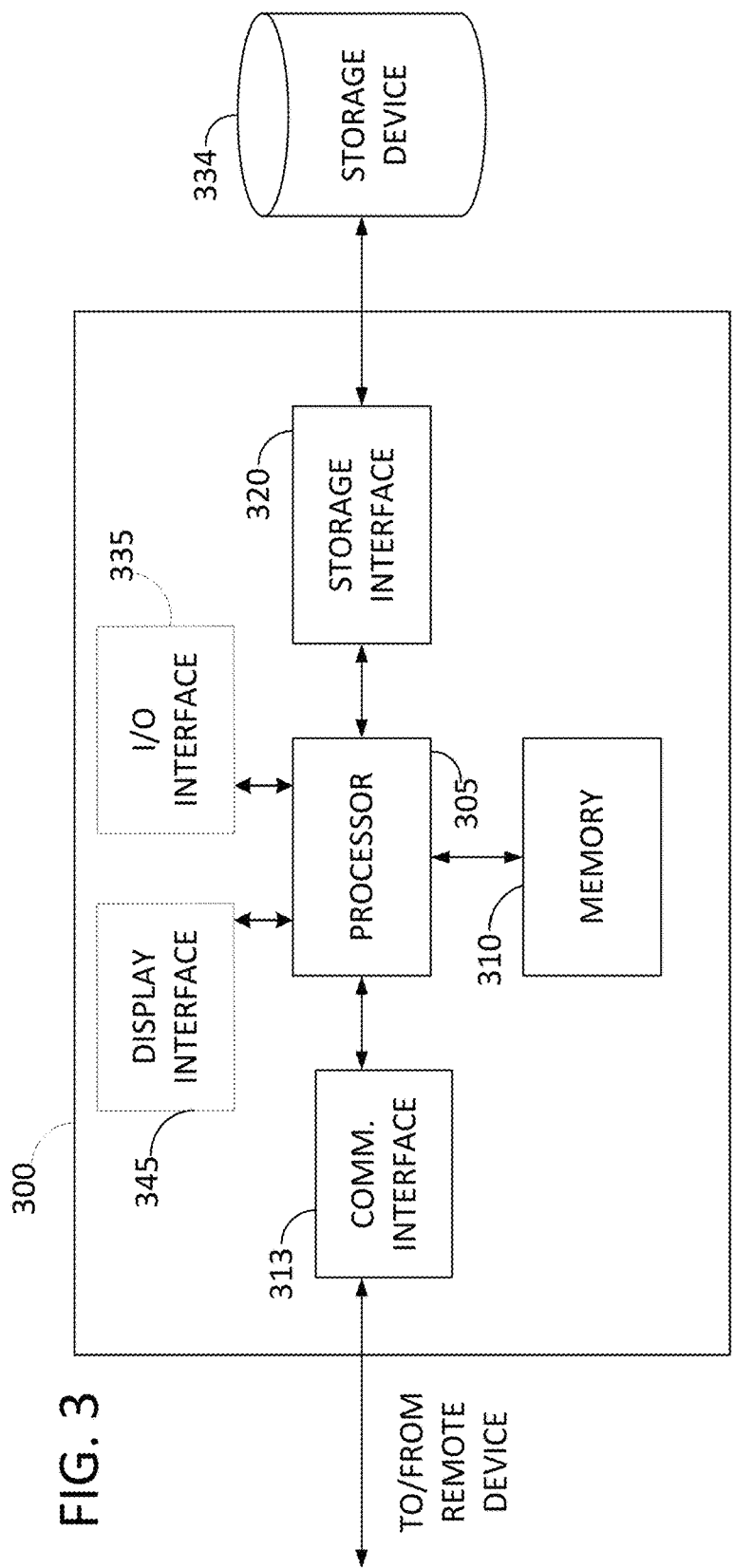
FIG. 3 is an example configuration of a server system that includes the FIC computing device.

FIG. 3 is an example configuration of a functional component computing device 300 that may be used as functional component computing device 211 (shown in FIG. 2). Functional component computing device 300 may be a computing device operating in communication with a thermostat or other temperature control device. Alternatively, functional component computing device 300 may be a component part of a thermostat or other temperature control device.

Functional component computing device 300 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the processor 305, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 313 such that functional component computing device 300 is capable of communicating with a remote device such as a user system or another functional component computing device 300. For example, communication interface 315 may receive communications from vendor computing devices 314 via the Internet, as illustrated in FIG. 1.

Processor 305 may also be operatively coupled to a storage device 334. Storage device 334 is any computer-operated hardware suitable for storing and/or retrieving data. In some embodiments, storage device 334 is integrated in functional component computing device 300. In other embodiments, storage device 334 is external to functional component computing device 300 and is similar to database 120 (shown in FIG. 2). For example, functional component computing device 300 may include one or more hard disk drives as storage device 134. In other embodiments, storage device 134 is external to functional component computing device 300 and may be accessed by a plurality of systems. For example, storage device 334 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
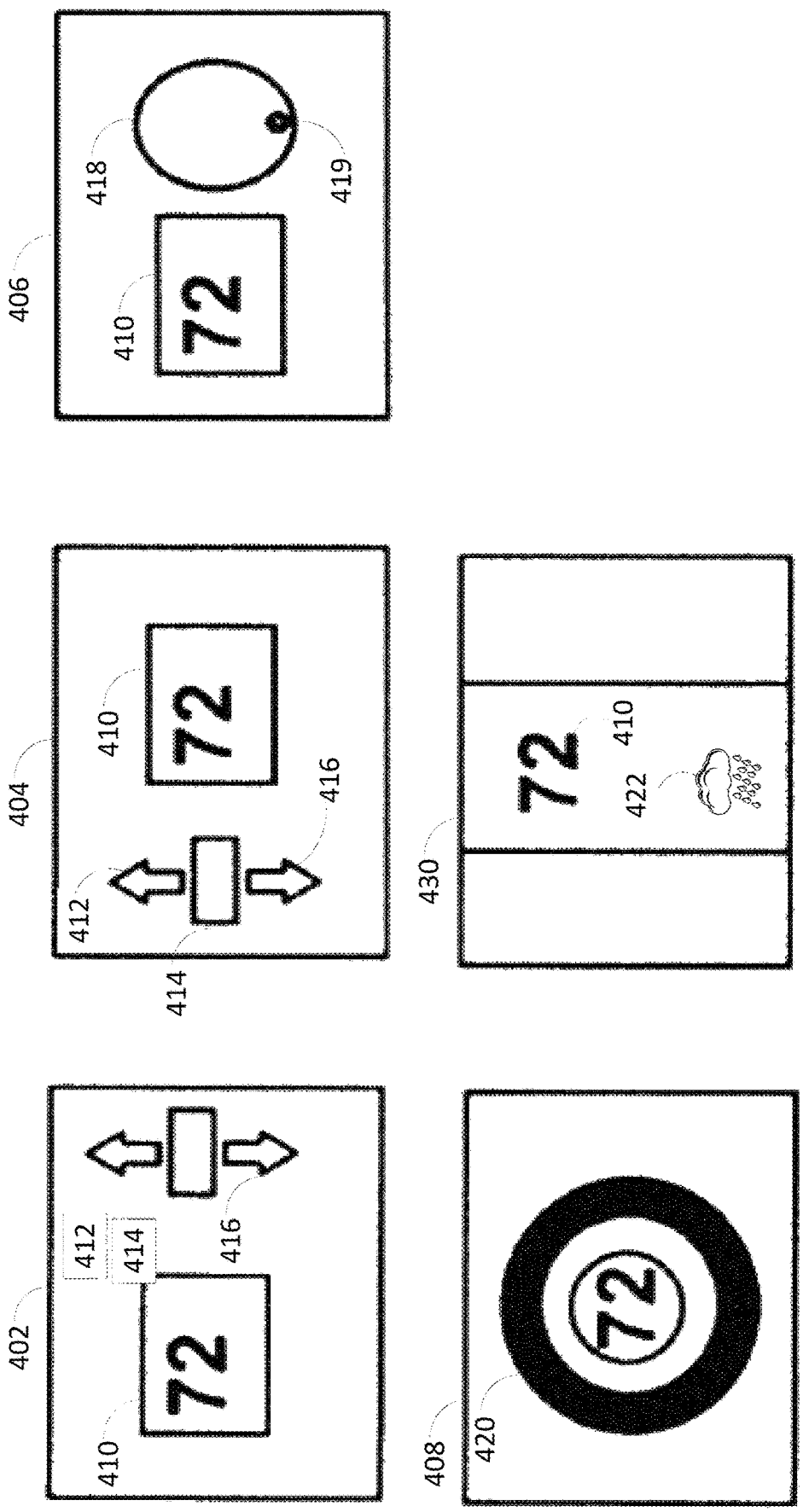
FIG. 4 is an example set of presentation layouts that are customized and selected using the FIC computing device.

FIG. 4 is an example set of presentation layouts that are customized and selected using FIC computing device 250 for use with functional component computing device 211 (both shown in FIG. 2). Each presentation layout includes one or more layout components. As used herein, "presentation layout" refers to a display configuration designed for use with a remote system controller display. For example, the remote system controller (also known as a functional component) may be a thermostat used inside a residence to control temperature or other functions. The layouts shown in FIG. 4 use a thermostat as an example to illustrate the functions of the FIC computing device 250. However, it is important to note that FIC computing device 250 is configured to enable a consumer to select and customize the layout of any remote system controller or any configurable display. In the example embodiment, the thermostat may have a display that shows various data such as current temperature, humidity, or the like. The thermostat display shows the data in a specific configuration, such as layouts 402, 404, 406, and 408 as shown in FIG. 4.

As used herein, "layout component" refers to a particular element of a presentation layout that can be relocated, removed, or reconfigured to help form a new presentation layout. A layout component may correspond to a particular function performed using the presentation layout on the display of the functional component. For example, the thermostat display may have one or more arrows representing functions such as "increase temperature", "decrease temperature" or the like. Each arrow is a layout component that may be relocated on the presentation layout in order to match a user's preferences. Additionally, a layout component may refer to display-only components that are not functionally customizable. For example, layout components include borders, graphic designs, or display components such as temperature displays that are customizable in terms of appearance (e.g., in terms of color, font, shape, etc.) but not function. Moreover, layout components may be unrelated to or have limited connection to the primary function of the functional component computing device. The unrelated layout components can include functional components and/or display-only components. For example, the display-only unrelated layout components for an HVAC controller may include a personal calendar component, an appointment reminder component, an image slideshow component, a newsfeeds component, and the like. Functional unrelated layout components for an HVAC controller can include a lighting control component, an alarm system control component, a sprinkler system control component, an audio system control component, or control components for any other suitable device or system.

Layout 402 includes a temperature display component 410, and temperature control components 412, 414, and 416. In one embodiment, temperature control components 412, 414, and 416 can be interacted with to change the temperature of a consumer's house. For example, interacting with temperature control component 412 (e.g., tapping the arrow layout component on the presentation layout 402) causes an instruction to the thermostat to increase the temperature setpoint.

Layout 404 includes the same components as in layout 402, but in a different display configuration. As noted above, FIC computing device 250 is configured to enable a consumer to select a layout for display on a remote system controller (also referred to as functional component computing device 211 shown in FIG. 2) such as a thermostat. Accordingly, a consumer may have layout 402 in use on a remote system controller but may choose to select layout 404 with the same layout components. In another embodiment, FIC computing device 250 enables a consumer to retrieve layout 402 using consumer computing device 214 and modify it until the result is layout 404. For example, a consumer may retrieve layout 402 and reorder the locations of temperature display component 410 and temperature control components 412, 414, and 416 until the resulting configuration is layout 404.

Layout 406 includes temperature display component 410 accompanied by a rotary temperature control component 418. Rotary temperature control component 418 includes a temperature adjust control 419. In one embodiment, FIC computing device 250 is configured to allow a consumer to select rotary temperature control component 418 for use with temperature display component 410. Rotary temperature control component 418 can be interacted with to adjust the temperature. For example, moving temperature adjust control 419 in a clockwise direction using a finger will cause additional components (not shown) to generate heat and thereby raise the temperature of the consumer's house.

Layout 408 includes a single temperature control and display component 420 that is used both to display temperature and to adjust temperature. FIC computing device 250 is configured to enable a consumer to modify the rectangular border for temperature display component 410 to be a circular border. In one embodiment, FIC computing device 250 is configured to enable a consumer to replace temperature display component 410 and rotary temperature control component 418 in layout 406 with temperature control and display component 420 and generate layout 408. In another embodiment, FIC computing device 250 is configured to enable a consumer to retrieve temperature display component 410 and rotary temperature control component 418 and graphically merge the two to generate the single temperature control and display component 420.

Layout 430 shows temperature display component 410. FIC computing device is configured to enable a consumer to modify temperature display component 410 to remove the enclosing border shown in layouts 402, 404, and 406. Layout 430 also shows weather icon component 422, designed to indicate external weather conditions (e.g., whether it is sunny, windy, raining, or the like). FIC computing device 250 is configured to enable a consumer to add or remove weather icon component 422 to or from layout 430.

Figure 5:
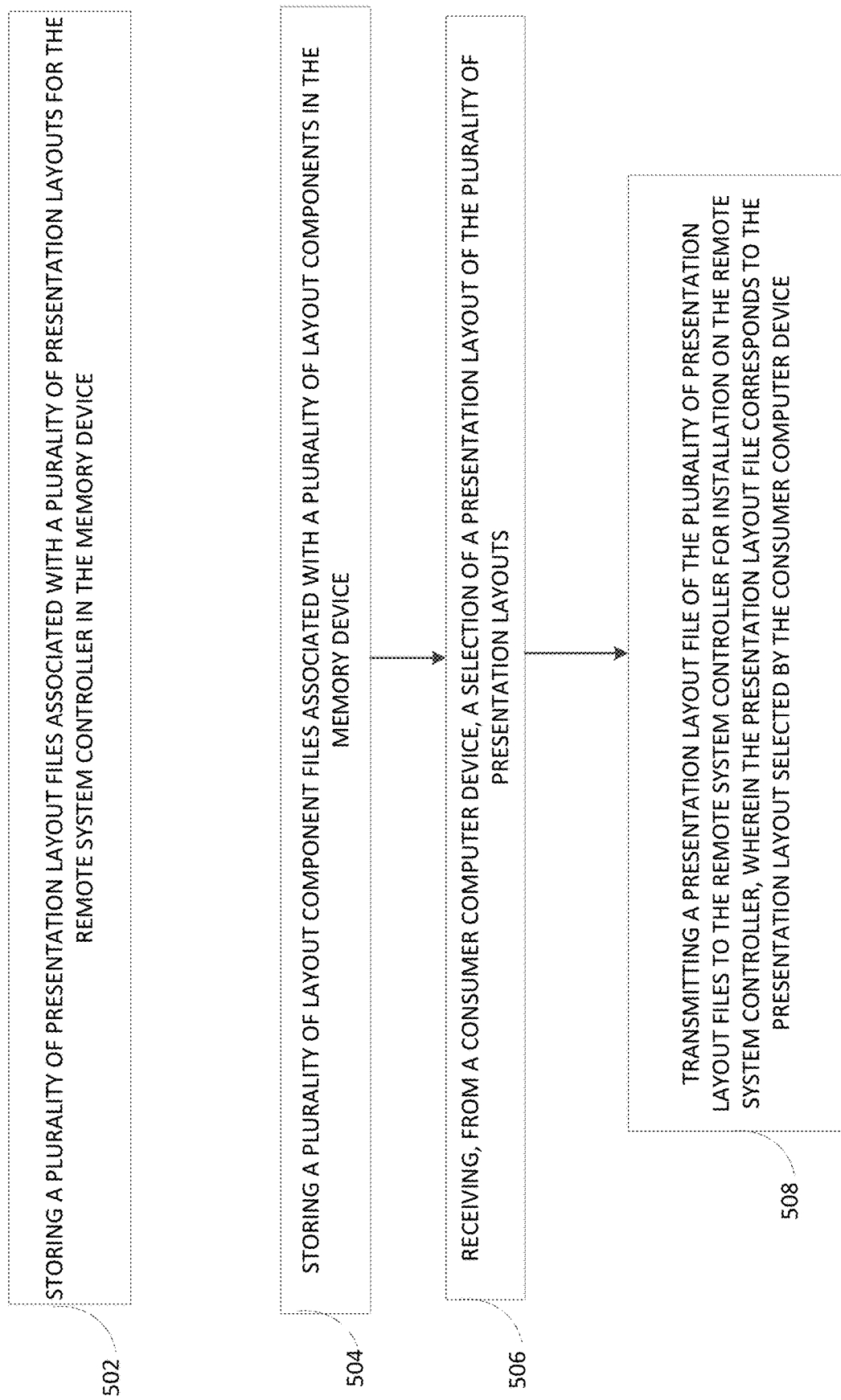
FIG. 5 is an example method by which the FIC computing device enables selection and customization of functional component interfaces.

FIG. 5 is an example method by which the FIC computing device enables selection and customization of functional component interfaces. FIC computing device 250 is configured to store 502 a plurality of presentation layout files associated with a plurality of presentation layouts for the remote system controller in the memory device. In one embodiment, a presentation layout file is a computer-readable data file configured to store presentation layout data in a format compatible with one or more remote system controllers. For example, each presentation layout file may be stored in multiple versions, each version corresponding to a remote system controller format. Based on receiving the remote system controller format, FIC computing device 250 is configured to retrieve the presentation layout file that is compatible with the specific remote system controller format. In another embodiment, regardless of format of the presentation layout files, FIC computing device 250 is configured to reformat the requested presentation layout file into a format compatible with the remote system controller that is designated to receive the presentation layout file. For example, a user may request a particular presentation layout file for a remote system controller using file format A. FIC computing device 250 is configured to detect format of the presentation layout file and reformat the presentation layout file into file format A if necessary.

FIC computing device 250 is configured to store 504 a plurality of layout component files associated with a plurality of layout components in the memory device. Similar to the storage process for presentation layout files in 502, FIC computing device 250 is configured to store layout component files in various file formats and/or convert a layout component file into a desired format for transmission to a remote system controller.

FIC computing device 250 is configured to receive 506, from consumer computing device 214 (shown in FIG. 2), a selection of a presentation layout of the plurality of presentation layouts. In one embodiment, a user selects a presentation layout from a list displayed on consumer computing device 214, and a remote system controller where the presentation layout is to be used. For example, the user may select layout 402 (as shown in FIG. 4) and provide a remote system controller identifier for transmission to FIC computing device 250. Based on the user selection, consumer computing device 214 transmits the presentation layout and remote system controller identifier to FIC computing device 250. FIC computing device 250 is configured to retrieve the presentation layout file corresponding to the selection of presentation layout received from consumer computing device 214. FIC computing device 250 is configured to locate the remote system controller corresponding to the received remote system controller identifier.

FIC computing device 250 is configured to transmit 508 a presentation layout file of the plurality of presentation layout files to the remote system controller for installation on the remote system controller, wherein the presentation layout file corresponds to the presentation layout selected by the consumer computing device. In one embodiment, FIC computing device 250 also transmits an instruction to the remote system controller to apply the presentation layout for display.

Figure 6:
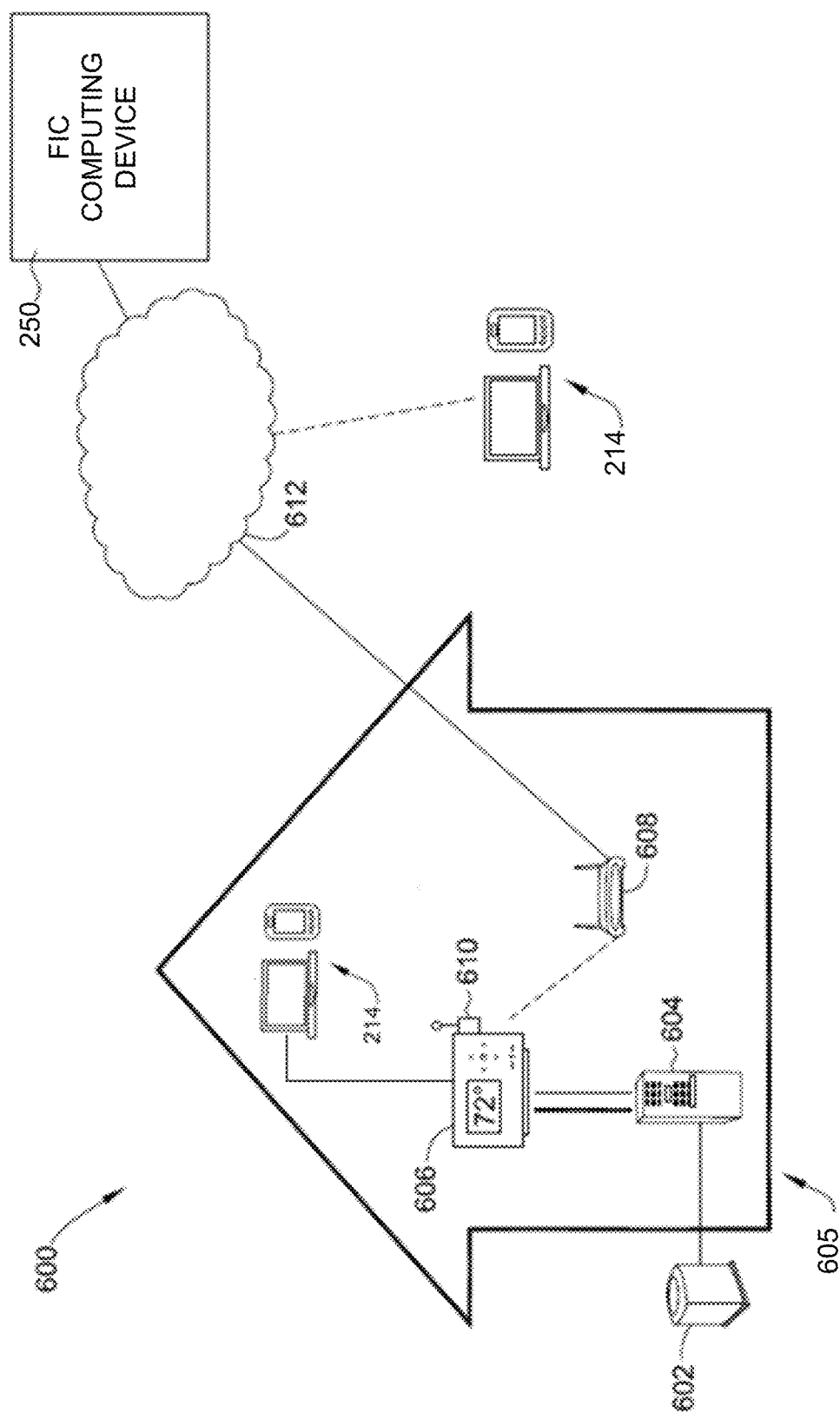
FIG. 6 is a schematic diagram of a system architecture for the (FIC) computing device.

FIG. 6 is a schematic diagram of an example system architecture 600 that includes the functional interface customization (FIC) computing device 250 and consumer computing device 214 (both shown in FIG. 2). In the example embodiment, FIC computing device 250 (similar to FIC computing device 250 shown in FIG. 2) is in communication with an equipment assembly 605 via a computer network such Internet 612. Additionally, FIC computing device 250 is also in communication with consumer computing device 214 (similar to consumer computing device 214 shown in FIG. 2) via Internet 612. FIC computing device 250 is configured to communicate with consumer computing device 214 in order to transmit selected and customized presentation layouts to remote system controllers associated with equipment assembly 605.

Equipment assembly 605 may include components such as, but not limited to, a residential heating and air conditioning system that includes a condenser unit 602, air handler/furnace unit 604 and a controller 606 such as a thermostat. Controller 606 is configured to control and also monitor the operation of equipment assembly 605. In some embodiments, the control and monitor functions of controller 606 are robust, meaning many parameters are monitored and more than one relatively complex algorithms are used to determine potential faults or deteriorated performance of equipment assembly 605. In the example embodiment, FIC computing device 250 transmits a customized presentation layout file to controller 606 for display. Controller 606 receives the presentation layout file, and updates its display in accordance with the received presentation layout file. As a result, a user of controller 606 can use the updated display to control the operation of equipment assembly 605. For example, where equipment assembly 605 includes air handler/furnace unit 604, the user may use the presentation layout to cause controller 606 to transmit a command to air handler/furnace unit 604, (e.g., to increase the ambient temperature).

Controller 606 is communicatively coupled to a network access point 608 through an equipment assembly communications device 610, if equipped. In an embodiment, network access point 608 may be embodied in a modem/router combination where the communication is either wireless or wired. In one embodiment, network access point 608 is a combination of two separate devices, for example, a wireless router and a separate modem connected to a network, such as, the Internet 612. Alternatively, a homeowner may enter theme information displayed on equipment assembly 605 using consumer computing device 214, embodied in a personal computer (PC) format or in a smartphone/tablet format. Consumer computing device 214 may access network 612 directly or through network access point 608. FIC computing device 250 (similar to FIC computing device 250 in FIG. 2) is communicatively coupled to network 612. Equipment assembly 605 information is received by FIC computing device 250 for processing as described herein. Consumer computing device 214 may also communicate directly with the controller 606 (e.g., through Bluetooth or NFC) without requiring a network connection and/or the Access point.

Figure 7:
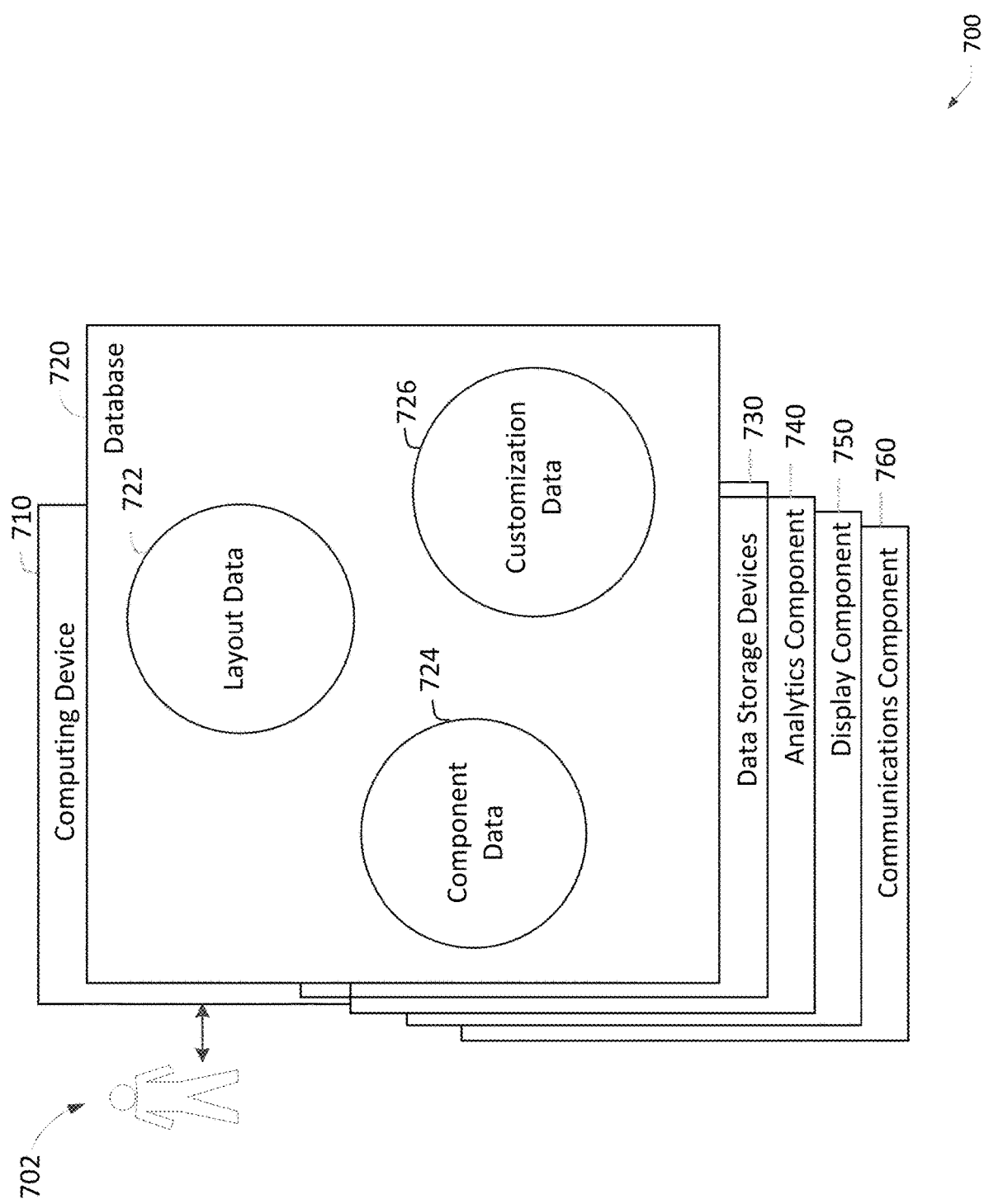
FIG. 7 is an example configuration of a database within a computing device that, along with other related computing components, may be used for selection and customization of functional component interfaces.

FIG. 7 is an example configuration of a database 700 within a computing device, along with other related computing components, that may be used for selection and customization of functional component interfaces. In some embodiments, computing device 710 is similar to FIC system 250 (shown in FIG. 2). User 702 (such as a consumer for a component) may access computing device 710 in order to manage a functional component interface. In some embodiments, database 720 is similar to database 120 (shown in FIG. 2). In the example embodiment, database 720 includes layout data 722, component data 724, and customization data 726. Layout data 722 includes data regarding each presentation layout (e.g., layout identifiers, version, status, associated computing devices, associated consumers, usage levels, ratings, or the like). Component data 724 includes data about each layout component (e.g., component identifiers, associated functions, associated computing devices, or the like). Customization data 726 includes modifications made to layouts provided by layouts, customizations associated with particular consumers, popular customizations, associated computing devices, or the like.

Computing device 710 also includes data storage devices 730. Computing device 710 also includes analytics component 740 that processes layout selections and customizations received from various consumer computing devices to generate layouts such as layouts 402, 404, 406, 408, and 430. Computing device 710 also includes display component 750 that receives layouts from analytics component 740 and converts it into various formats in order to provide layout data in a format compatible with various different functional component computing device. Computing device 710 also includes communications component 760 which is used to communicate with consumer computing devices, functional component computing device, and operator computing devices using predefined network protocols such as TCP/IP (Transmission Control Protocol/Internet Protocol) over the Internet.

An example of a user customizing a user interface using a system for selection and customization of functional component interfaces, such as system 600 for example, will be described with reference to FIGS. 8-13.

Figure 8:
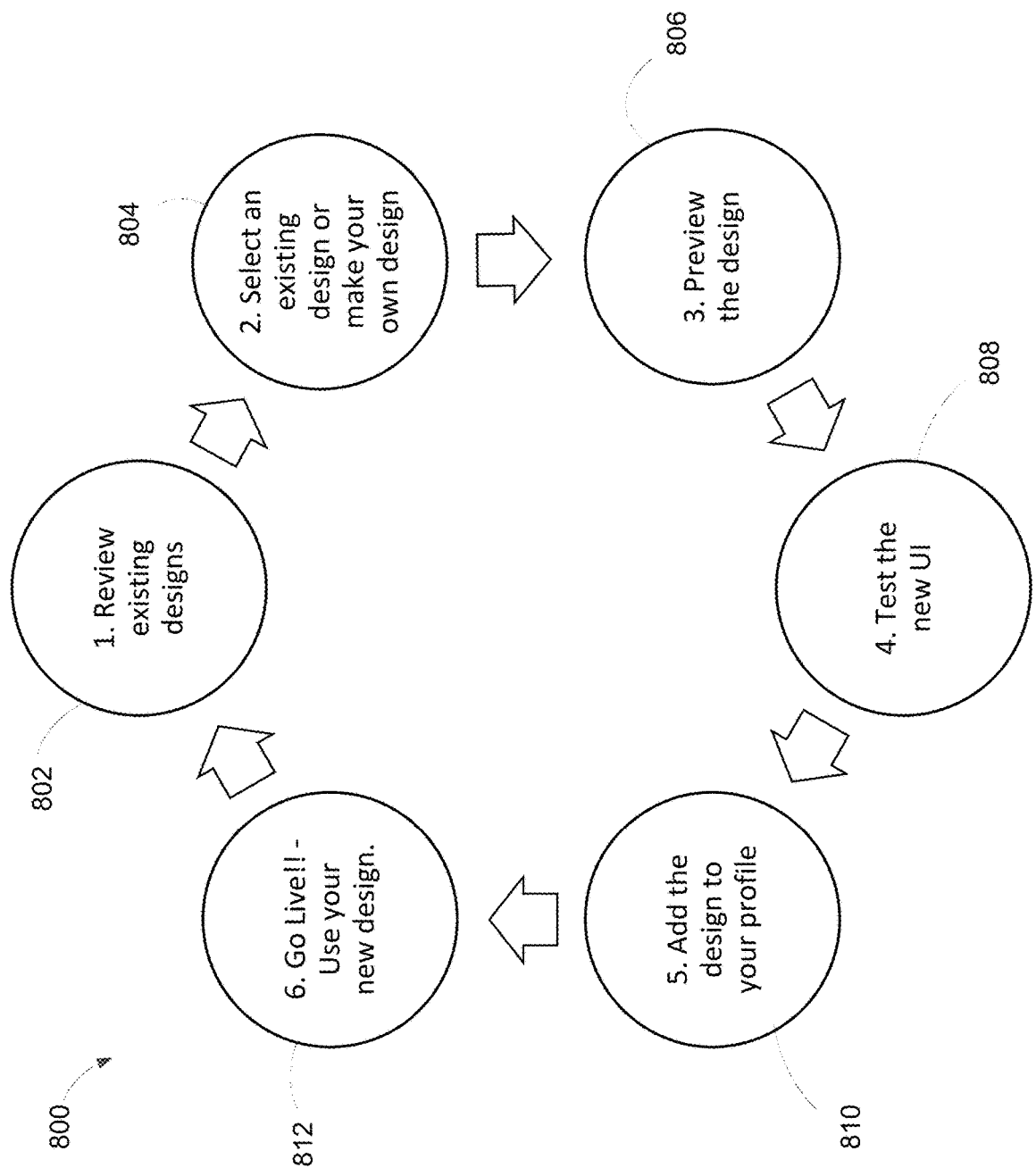
FIG. 8 is a flow diagram of a method for customizing a user interface.
Figure 9:
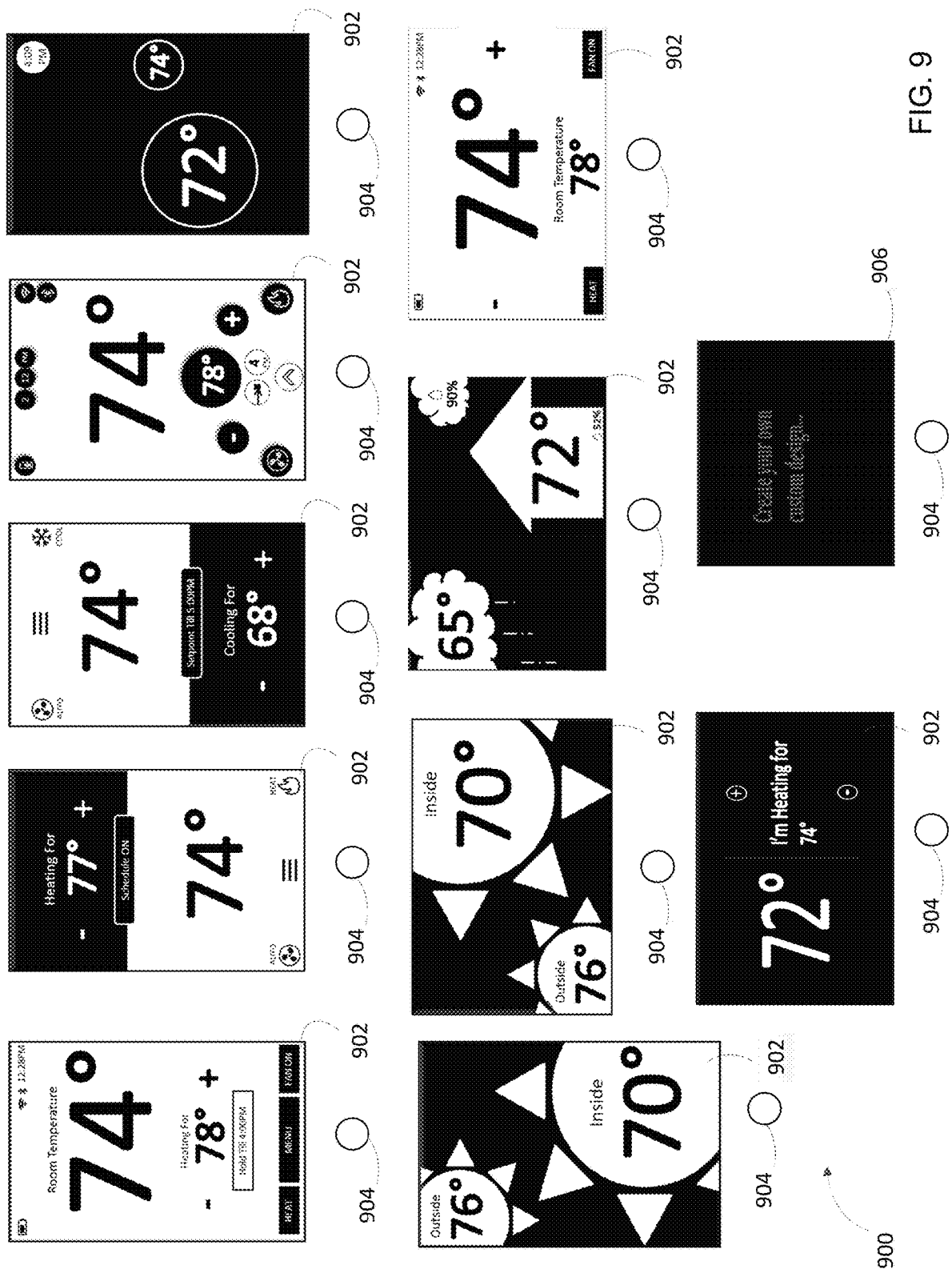
FIG. 9 is an example display of presentation layouts.

FIG. 8 is a flow diagram of a method 800 for the user to customize a user interface. At 802, the user is presented, for example by the FIC computing device 250, with user interface designs (also referred to as presentation layouts) to review. FIG. 9 is an example display 900 of presentation layouts 902 that are displayed to the user at step 802. The presentation layouts 902 are displayed to the user on a consumer computing device, such as consumer computing device 214. In addition to the predesigned presentation layouts 902, the display 900 includes a custom design presentation layout 906. At 804 of FIG. 8, the user selects one of the existing, predesigned presentation layouts 902 or selects to create a custom design presentation layout 906. In this example, the selection is made by selecting one of radio buttons 904, shown in FIG. 9. In other embodiments, any other suitable method for selecting may be used.

Figure 10:
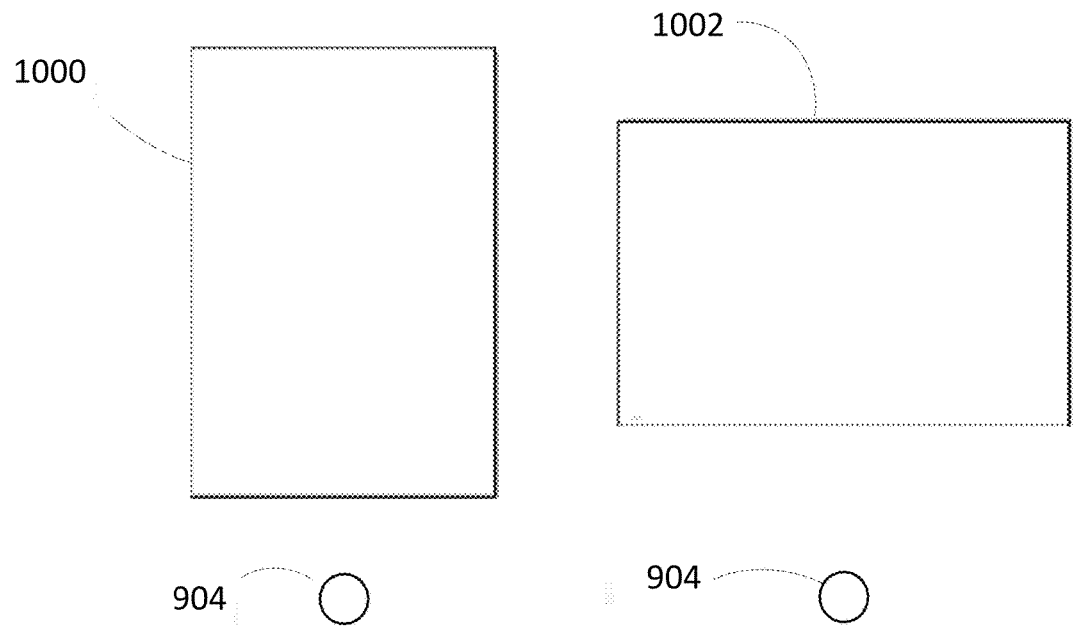
FIG. 10 is an example display of an option to select a portrait orientation or a landscape orientation for a custom presentation layout.

If the user selected to create a custom design, the user next designs the presentation layout. In FIG. 10, the user is presented with the option to select a portrait orientation 1000 or a landscape orientation for the custom presentation layout using radio buttons 904. After selecting the orientation, the user is presented with a blank presentation layout with the selected orientation.

Figure 11:
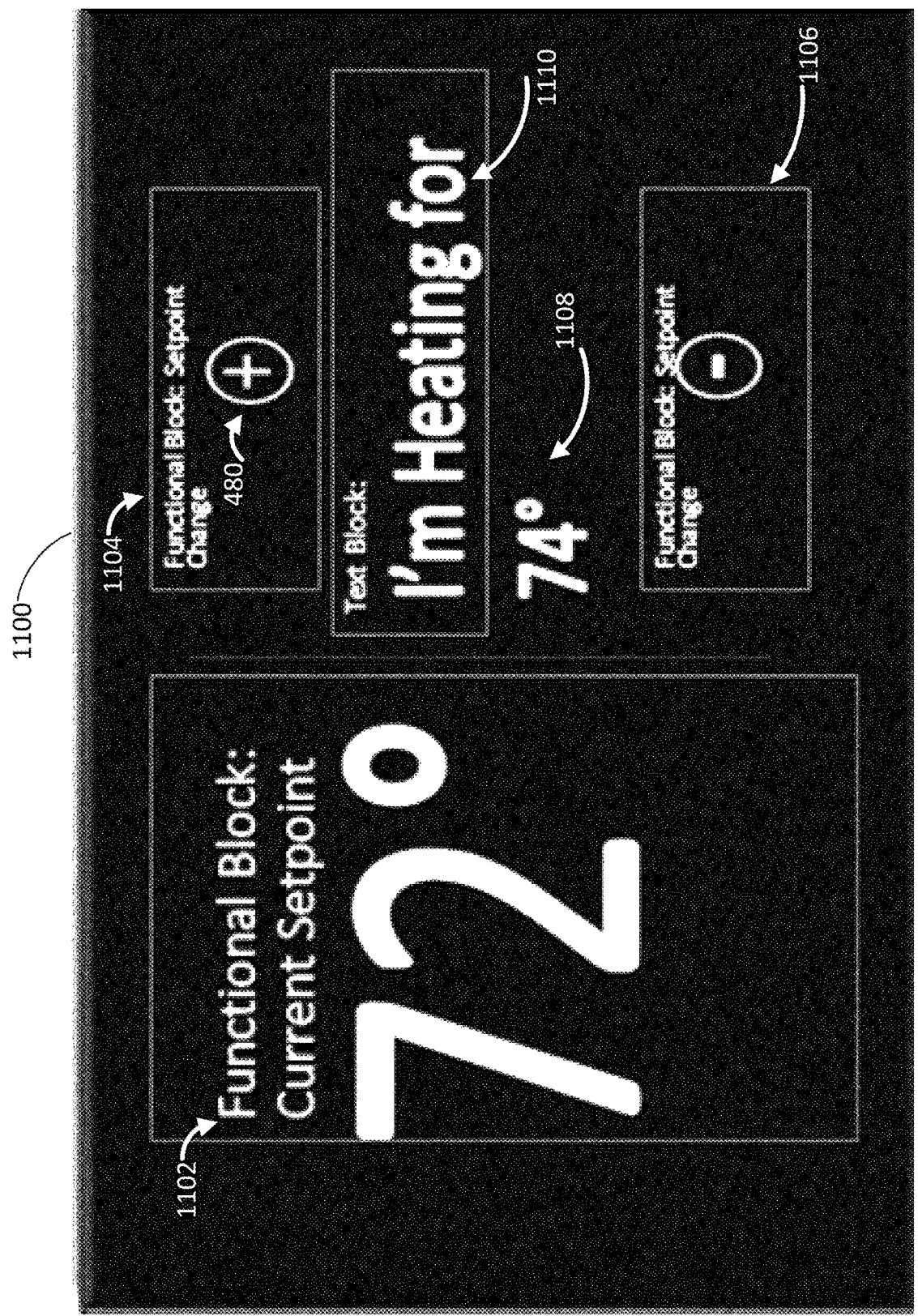
FIG. 11 is an example layout configuration screen for customizing a presentation layout.

FIG. 11 is an example layout configuration screen that the user uses to customize the presentation layout 1100. The layout configuration screen is displayed on consumer computing device 214. In this example, the user begins with a blank presentation layout of the selected orientation and adds layout components to build the custom presentation layout 1100. In other embodiments, one or more layout components may be prepopulated by the system onto the presentation layout 1100. Layout components include functional blocks, text blocks, design items (e.g., lines, graphics, shadows, images etc.), or the like. Functional blocks include blocks to provide any suitable function for the device for which the presentation interface 1104 is being designed. Example functional blocks for an HVAC thermostat include a current setpoint block, a current room temperature block, a current room humidity block, a setpoint change input block, a humidity change input block, a menu block, a system settings block, an operational mode block, a fan selection block, and the like. The consumer can use controls on consumer computing device 214 (e.g., keys, buttons, taps on a screen) to select layout components and drag and drop them to desired locations on the blank presentation layout. The user can drag layout components around the presentation layout and also customize their appearance. In one embodiment, clicking or tapping a layout component will result in a customization menu (not shown) enabling the consumer to customize details of the layout component (e.g., colors, fonts, size, etc.).

In the example embodiment, layout configuration screen the user has added a variety of functional and text blocks to create the custom presentation layout 1100. Custom presentation layout 1100 includes functional blocks 1102, 1104, 1106, and 1108. Functional block 1102 is used to display the current temperature setpoint. Functional blocks 1104 and 1106 are setpoint change input blocks that allow an operator to change the temperature setpoint (e.g., increase temperature, decrease temperature). Functional block 1108 is a current room temperature block. Custom presentation layout 1100 also includes a text block 1110 that used to present custom text (input by the user).

During or after customization, the FIC computing device 250 analyzes the selected position for each selected layout component to determine at least one pixel position for the selected layout component. For example, the blank presentation layout may be of size 1000×2000 pixels. A selected layout component may be of size 100×100 pixels, and may be placed by the consumer in the extreme upper left corner of the blank presentation layout. Accordingly, FIC computing device 250 is configured to assign pixels 0-100 both vertically and horizontally to the selected layout component on the blank presentation layout.

Given the assignment, FIC computing device dynamically updates a stored presentation layout file associated with the blank presentation layout. For example, FIC computing device 250 may store an indicator of blank space remaining on the presentation layout after the assignment for the selected layout component. If user attempts to create a presentation layout with overlapping layout components, FIC computing device 250 may transmit an error message to consumer computing device 214.

Figure 12:
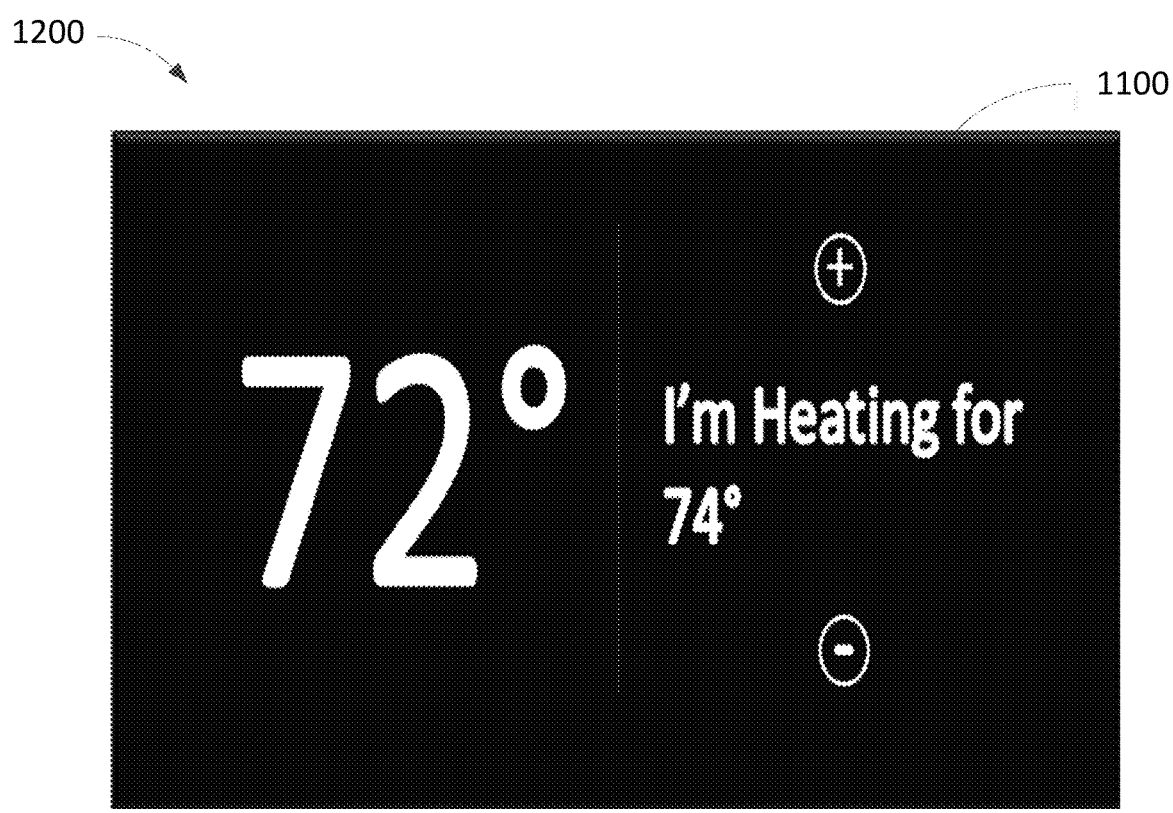
FIG. 12 is an example preview display of a presentation layout.
Figure 13:
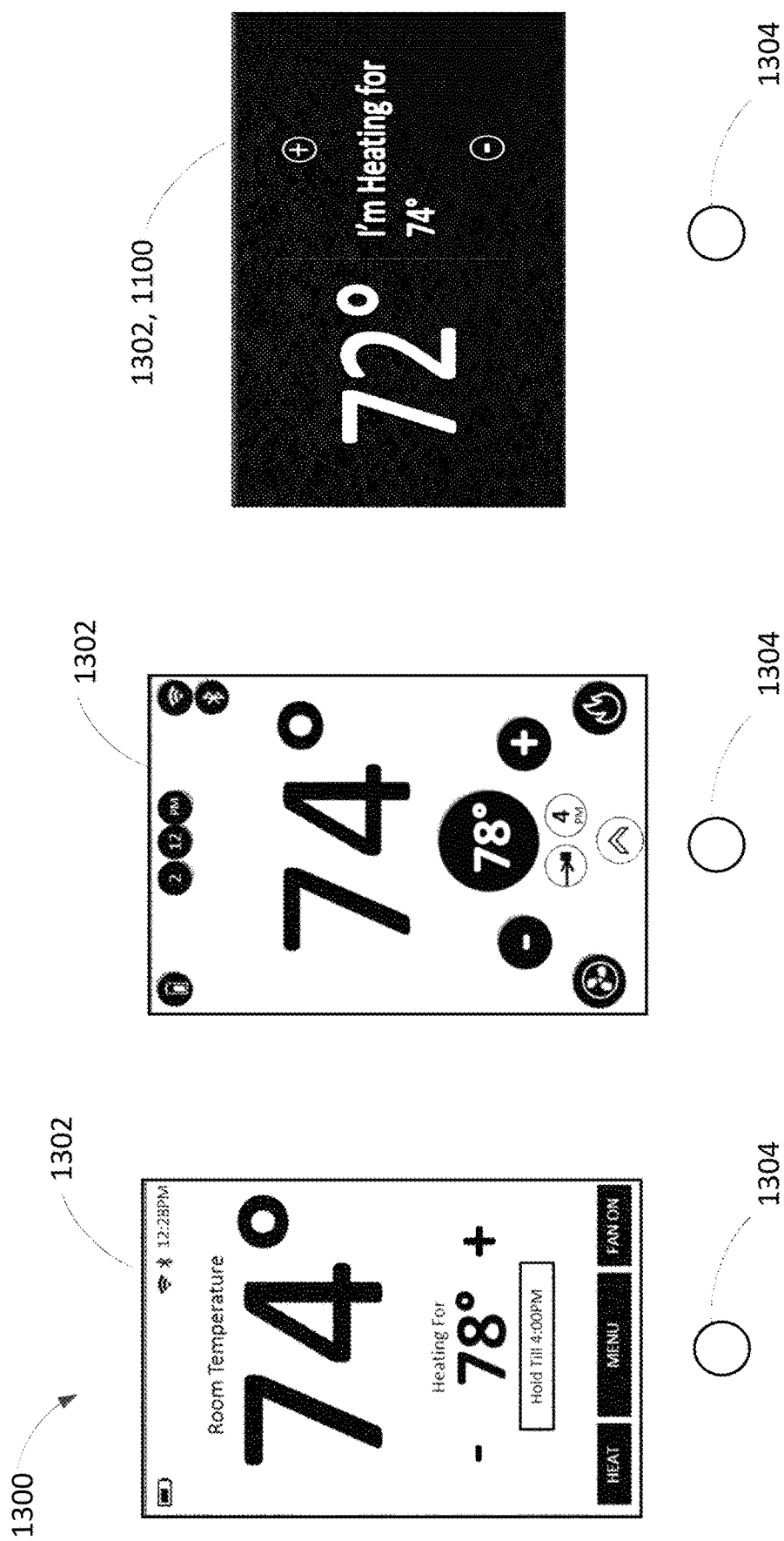
FIG. 13 is an example user profile display.

After the user is satisfied with the custom presentation layout 1100, the user moves on to preview the design at 806 (shown in FIG. 8). If the user selected a predesigned presentation layout, rather than a custom layout, the customization discussed above is skipped and the user proceeds directly to preview the design. In some embodiments, the user may be permitted to customize the predesigned presentation layout before proceeding to preview the design. FIG. 12 is an example preview display 1200 of the presentation layout 1100. In the example embodiment, the preview is displayed on the remote system controller, such as controller 606. Alternatively, the preview may be displayed on the consumer computing device 214. The user tests the presentation layout 1100 at 808 to determine if the user satisfied with the presentation layout 1100. If the user is not satisfied the user may return to continue to customize the design or select a new design. If the user is satisfied, the presentation layout 1100 is added to the user's profile/account. FIG. 13 is an example profile display 1300 for the user. The display 1300 includes all of the presentation layouts 1302 added by the user to the user's profile. The user selects, such as using radio buttons 1304, which of the presentation layouts the user would like to use with the associated remote system controller. The selected presentation layout is then transmitted to and installed on the remote system controller. At 812 in FIG. 8, the user can begin using the selected presentation layout to interact with the remote system controller.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The technical effect of the methods and systems may be achieved by performing at least one of the following steps: (a) storing a plurality of presentation layout files associated with a plurality of presentation layouts for the remote system controller in the memory device, (b) storing a plurality of layout component files associated with a plurality of layout components in the memory device, (c) receiving, from a consumer computing device, a selection of a presentation layout of the plurality of presentation layouts, and (d) transmitting a presentation layout file of the plurality of presentation layout files to the remote system controller for installation on the remote system controller, wherein the presentation layout file corresponds to the presentation layout selected by the consumer computing device.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of communicating maintenance service requests to a plurality of pre-qualified maintenance service providers provides a cost-effective and reliable means for receiving the maintenance service requests from users and monetizing that information by hosting a bidding process for the contact information of the user by the maintenance service providers. More specifically, the methods and systems described herein facilitate aligning maintenance service providers that are interested in performing the maintenance associated with the maintenance service request with the user in-charge of equipment assembly 605. In addition, the above-described methods and systems facilitate reduce the cost of lead generation for the maintenance service providers. As a result, the methods and systems described herein facilitate providing users and maintenance service providers an avenue for quick communication in a cost-effective and reliable manner.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A method for customizing an interactive presentation layout for a thermostat for a heating, ventilation, and air conditioning (HVAC) system, the method implemented by a functional interface customization (FIC) computing device comprising a memory device, a processor, and the interactive presentation layout, the method comprising:

storing, by the FIC computing device, a plurality of presentation layout files associated with a plurality of presentation layouts for the thermostat in the memory device;

storing, by the FIC computing device, a plurality of layout component files associated with a plurality of layout components in the memory device;

receiving, from a consumer computing device, a selection of a presentation layout of the plurality of presentation layouts;

modifying, using the FIC computing device, the selected presentation layout using layout components associated with the selected presentation layout, the layout components including:

a display component that is customizable in terms of appearance only, the display component configured to display data about the HVAC system controlled by the thermostat;

a separate control component associated with the display component, the separate control component configured to control an operation of the HVAC system controlled by the thermostat; and a combination component that is formed from the display component and the control component that are merged together graphically such that the combination component has the appearance of the display component and the control functionality of the control component, a physical interaction with the combination component on a touchscreen display causing an instruction to be sent by the merged control component to a controlled device of the HVAC system, the instruction changing a parameter setpoint of the represented controlled device; and transmitting, via a network, a presentation layout file of the plurality of presentation layout files to the thermostat for installation on the thermostat, wherein the presentation layout file corresponds to the presentation layout selected and modified by the consumer computing device.

2. The method of claim 1, wherein the at least one presentation layout includes at least one layout component corresponding to a function performed by the thermostat.

3. The method of claim 1, further comprising:

displaying one or more functionality sets on the consumer computing device, wherein the one or more functionality sets is associated with at least one operation of the thermostat, and wherein the one or more functionality sets include at least one of thermostat functionality, time management functionality, date management functionality, news review functionality, security control functionality, audio control functionality, image management functionality, and appliance control functionality;

receiving, from the consumer computing device, a selection of at least one functionality set of the one or more functionality sets;

identifying one or more presentation layout files of the plurality of presentation layout files, wherein the one or more presentation layout files is associated with the selection; and transmitting the one or more presentation layout files to the thermostat.

4. The method of claim 1, further comprising transmitting, for display on the consumer computing device, the plurality of presentation layouts.

5. The method of claim 4, further comprising:

transmitting, for display on the consumer computing device, a plurality of layout components, wherein each of the plurality of layout components corresponds to one of the plurality of layout component files;

receiving, from the consumer computing device, a selection of at least one layout component, and a selection of a position for the selected layout component on the selected presentation layout; and generating a candidate presentation layout file based on the selected presentation layout, the selected layout component, and the selected position for the selected layout component on the selected presentation layout, the candidate presentation layout file configured to cause the thermostat to display a candidate presentation layout based on the selected presentation layout with the selected layout component in the selected position and to allow consumer interaction with the selected presentation layout on the thermostat.

6. The method of claim 5, further comprising receiving from one of the thermostat and the consumer computing device, a purchase data signal indicating the consumers intent to keep the candidate presentation layout.

7. The method of claim 1, wherein transmitting a presentation layout file of the plurality of presentation layout files to the thermostat for installation on the thermostat comprises transmitting the presentation layout file to the thermostat from the consumer computing device.

8. The method of claim 1, wherein transmitting the presentation layout file of the plurality of presentation layout files to the thermostat for installation on the thermostat comprises transmitting the presentation layout file to the thermostat from the FIC computing device.

9. The method of claim 5, wherein generating the candidate presentation layout file further comprises:

analyzing the selected position for the selected layout component to determine at least one pixel position for the selected layout component; and assigning at least one pixel in a plurality of pixels of the presentation layout to the determined pixel position and the selected layout component.

10. A system for customizing an interactive presentation layout for a thermostat for a heating, ventilation, and air conditioning (HVAC) system, the system comprising:

a database, stored in a memory device comprising a predetermined data structure of the database that includes customization data modifiable by a user; and a functional interface customization (FIC) computing device communicatively couplable to the database, the FIC computing device further configured to:

store a plurality of presentation layout files associated with a plurality of presentation layouts for the thermostat in the memory device;

store a plurality of layout component files associated with a plurality of layout components in the memory device;

receive, from a consumer computing device, a selection of a presentation layout of the plurality of presentation layouts;

modify the selected presentation layout using layout components associated with the selected presentation layout, the layout components including:

a display component that is customizable in terms of appearance, the display component configured to display data about the HVAC system controlled by the thermostat;

a separate control component associated with the display component, the separate control component configured to control an operation of the HVAC system controlled by the thermostat; and a combination component formed from the display component graphically merged to the control component such that the combination component has the appearance of the display component and the control functionality of the control component, a physical interaction with the combination component by a user on a touchscreen display causes an instruction to be sent to a controlled device of the HVAC system, the instruction changing a parameter setpoint of the represented controlled device; and transmit a presentation layout file of the plurality of presentation layout files to the thermostat for installation on the thermostat, wherein the presentation layout file corresponds to the presentation layout selected by the consumer computing device.

11. The system in accordance with claim 10, wherein the at least one presentation layout includes at least one layout component corresponding to a function performed by the thermostat.

12. The system in accordance with claim 10, wherein the FIC computing device is further configured to transmit via a network connection, for display on the consumer computing device, the plurality of presentation layouts.

13. The system in accordance with claim 10, wherein the FIC computing device is further configured to:

transmit, via a network connection, for display on the consumer computing device, a plurality of layout components, wherein each of the plurality of layout components corresponds to one of the plurality of layout component files;

receive, via the network connection, from the consumer computing device, a selection of at least one layout component, and a selection of a position for the selected layout component on the selected presentation layout; and generate a candidate presentation layout file based on the selected presentation layout, the selected layout component, and the selected position for the selected layout component on the selected presentation layout, the information in the candidate presentation layout file is used by the thermostat to display a candidate presentation layout based on the selected presentation layout with the selected layout component in the selected position and to allow consumer interaction with the selected presentation layout on the thermostat.

14. The system in accordance with claim 10, wherein, to transmit a presentation layout file of the plurality of presentation layout files to the thermostat for installation on the thermostat, the FIC computing device is further configured to transmit, via a network connection, the presentation layout file to the thermostat from the consumer computing device.

15. The system in accordance with claim 10, wherein, to transmit a presentation layout file of the plurality of presentation layout files to the thermostat for installation on the thermostat, the FIC computing device is further configured to transmit, via a network connection, the presentation layout file to the thermostat troller from the FIC computing device.

16. The system in accordance with claim 13, wherein, to generate the candidate presentation layout file, the FIC computing device is further configured to:
   analyze the selected position for the selected layout component to determine at least one pixel position for the selected layout component; and
   assign at least one pixel in a plurality of pixels of the presentation layout to the determined pixel position and the selected layout component.

17. A non-transitory computer readable medium that includes computer executable instructions for customizing an interactive presentation layout for a thermostat for a heating, ventilation, and air conditioning (HVAC) system, wherein when executed by a functional interface customization (FIC) computing device comprising a processor in communication with a memory device, the computer executable instructions cause the FIC computing device to:
   store a plurality of presentation layout files associated with a plurality of presentation layouts for the thermostat in the memory device;
   store a plurality of layout component files associated with a plurality of layout components in the memory device;
   receive, from a consumer computing device, a selection of a presentation layout of the plurality of presentation layouts;
   modify the selected presentation layout using layout components associated with the selected presentation layout, the layout components including:
      a display component that is customizable in terms of appearance only, the display component configured to display data about the HVAC system controlled by the thermostat;
      a separate control component associated with the display component, the separate control component configured to control an operation of the HVAC system controlled by the thermostat; and
      a graphically merged display component and a control component forming a single combination component, a physical interaction with the single combination component on a touchscreen display causes an instruction to be sent to a controlled device of the HVAC system, the instruction changing a parameter setpoint of the represented controlled device; and
   transmit a presentation layout file of the plurality of presentation layout files to the thermostat for installation on the thermostat, wherein the presentation layout file corresponds to the presentation layout selected by the consumer computing device.

18. The non-transitory computer readable medium in accordance with claim 17, wherein the computer-executable instructions cause the FIC computing device to transmit, for display on the consumer computing device, the plurality of presentation layouts.

19. The non-transitory computer readable medium in accordance with claim 17, wherein the computer-executable instructions cause the FIC computing device to:
   transmit, for display on the consumer computing device, a plurality of layout components, wherein each of the plurality of layout components corresponds to one of the plurality of layout component files;
   receive, from the consumer computing device, a selection of at least one layout component, and a selection of a position for the selected layout component on the selected presentation layout; and
   generate a candidate presentation layout file based on the selected presentation layout, the selected layout component, and the selected position for the selected layout component on the selected presentation layout, the candidate presentation layout file configured to cause the thermostat to display a candidate presentation layout based on the selected presentation layout with the selected layout component in the selected position and to allow consumer interaction with the selected presentation layout on the thermostat.

20. The non-transitory computer readable medium in accordance with claim 17, wherein, to generate the candidate presentation layout file, the computer-executable instructions cause the FIC computing device to:
   analyze the selected position for the selected layout component to determine at least one pixel position for the selected layout component; and
   assign at least one pixel in a plurality of pixels of the presentation layout to the determined pixel position and the selected layout component.

* * * * *